(12) United States Patent
Burmester

(10) Patent No.: US 11,371,645 B2
(45) Date of Patent: Jun. 28, 2022

(54) MOUNTING LINK FOR SUPPORTING A PIECE OF HARDWARE

(71) Applicant: Ergonomic Solutions International Limited, Epsom (GB)

(72) Inventor: Benny Burmester, Aalborg (DK)

(73) Assignee: Ergonomic Solutions International Limited, Surrey (GB)

( * ) Notice: Subject to any disclaimer, the term of this patent is extended or adjusted under 35 U.S.C. 154(b) by 175 days.

(21) Appl. No.: 16/471,614

(22) PCT Filed: Dec. 20, 2017

(86) PCT No.: PCT/EP2017/083859
§ 371 (c)(1),
(2) Date: Jun. 20, 2019

(87) PCT Pub. No.: WO2018/115144
PCT Pub. Date: Jun. 28, 2018

(65) Prior Publication Data
US 2021/0131607 A1 May 6, 2021

(30) Foreign Application Priority Data
Dec. 21, 2016 (DK) .............................. 2016 00781

(51) Int. Cl.
*F16M 11/10* (2006.01)
*F16M 13/02* (2006.01)
*F16M 11/20* (2006.01)
*G07G 1/00* (2006.01)

(52) U.S. Cl.
CPC ............ *F16M 11/10* (2013.01); *F16M 13/02* (2013.01); *F16M 11/2014* (2013.01); *F16M 2200/02* (2013.01); *F16M 2200/08* (2013.01); *G07G 1/0018* (2013.01)

(58) Field of Classification Search
CPC ............... F16M 2200/08; F16M 11/10; F16M 2200/024; F16M 2200/028; A47F 7/0246; G07G 1/0018
See application file for complete search history.

(56) References Cited

U.S. PATENT DOCUMENTS

| | | | | |
|---|---|---|---|---|
| 3,462,112 A | * | 8/1969 | Novak | H01R 35/02 248/349.1 |
| 4,725,027 A | * | 2/1988 | Bekanich | A61M 5/1415 248/125.8 |
| 4,923,154 A | * | 5/1990 | Konkel | F16M 11/08 248/131 |

(Continued)

FOREIGN PATENT DOCUMENTS

| | | |
|---|---|---|
| CA | 2534597 A1 | 7/2007 |
| CN | 201196323 Y | 2/2009 |
| WO | 2015013807 A1 | 2/2015 |

*Primary Examiner* — Bradley Duckworth
(74) *Attorney, Agent, or Firm* — James Creighton Wray

(57) ABSTRACT

The present invention relates to a mounting link (100) for supporting a piece of hardware. The mounting link (100) comprising a tubular base section (200), and a tubular body section (300), wherein the tubular base section (200) comprises a first part of a snap lock mechanism configured as a locking lip (210) and a first female/male component (220), the first female component (220) configured to removably receive a first male component (320) of the body section (300).

14 Claims, 3 Drawing Sheets

(56) References Cited

U.S. PATENT DOCUMENTS

| | | | | |
|---|---|---|---|---|
| 5,569,895 | A  * | 10/1996 | Lynch | F16M 11/10 |
| | | | | 235/1 R |
| 6,702,238 | B1 * | 3/2004 | Wang | F16M 11/10 |
| | | | | 248/125.8 |
| 6,923,154 | B2 | 8/2005 | Gschwindt et al. | |
| 8,313,067 | B2 * | 11/2012 | Knieriem | F16M 11/42 |
| | | | | 248/129 |
| 9,416,913 | B2 * | 8/2016 | Ferguson | F16M 11/12 |
| 10,738,939 | B2 * | 8/2020 | Burmester | F16C 11/103 |
| 2007/0295878 | A1 * | 12/2007 | Smed | F16M 11/2014 |
| | | | | 248/413 |
| 2008/0116328 | A1 | 5/2008 | Wang | |
| 2008/0251674 | A1 | 10/2008 | Su | |
| 2013/0048803 | A1 | 2/2013 | Tang | |
| 2018/0205409 | A1 * | 7/2018 | Burmester | F16M 13/022 |

* cited by examiner

MOUNTING LINK FOR SUPPORTING A PIECE OF HARDWARE

This application claims the benefit of Danish Application No. PA 2016 00781 filed Dec. 21, 2016 and PCT/EP2017/083859 filed Dec. 20, 2017, International Publication No. WO 2018/115144 A1, and the amended sheets from the Annexes to the Written Opinion, which are hereby incorporated by reference in their entirety as if fully set forth herein.

TECHNICAL FIELD OF THE INVENTION

The present invention relates to a mounting link for use for a plate/mounting head on which a piece of hardware, such as a card terminal, payment terminal, or tablet, may be secured.

BACKGROUND OF THE INVENTION

It is an object of the present invention to provide a compact mounting link, preferably rotatable, for a plate/mounting head on which a piece of hardware, such as a card terminal, payment terminal, or tablet, may be secured.

Mobile electronic devices may have user displays that can be orientated in portrait or landscape positions. Mobile electronic devices may automatically change the orientation of the user screen based on how the mobile electronic device is being held. It is an object of the present invention to provide a compact mounting link, which may be used to easily locate typical operating positions of the hardware when docked. Especially important is to provide a mounting link with minimal slack when the user operates the hardware coupled thereto.

SUMMARY OF THE INVENTION

A first aspect relates to a mounting link comprising a tubular base section, and a tubular body section;
wherein the tubular base section comprises:
a1) a first part of a snap lock mechanism configured as a locking lip; and
b1) a first female/male component, the first female component configured to removably receive a first male component of the body section;
wherein the tubular body section comprises:
a1) a second part of a snap lock mechanism configured as a supporting flange for the locking lip of the tubular base section to engage with; and
b1) a first male/female component, the first female component configured to removably receive a first male component of the tubular base section;
or
wherein the tubular base section comprises:
a2) a first part of a snap lock mechanism configured as a supporting flange for a locking lip of the tubular body section to engage with;
b2) a first female/male component, the first female component configured to removably receive a first male component of the body section;
wherein the tubular body section comprises:
a2) a second part of a snap lock mechanism configured as a locking lip for engaging with the supporting flange of the tubular base section;
b2) a first male/female component, the first female component configured to removably receive a first male component of the tubular base section.

A second aspect relates to a mounting link comprising a tubular base section, and a tubular body section;
wherein the tubular base section comprises:
a1) a first part of a snap lock mechanism configured as a locking lip; and
b1) a first female/male component, the first female component configured to removably receive a first male component of the body section;
wherein the tubular body section comprises:
a1) a second part of a snap lock mechanism configured as a supporting flange for the locking lip of the tubular base section to engage with; and
b1) a first male/female component, the first female component configured to removably receive a first male component of the tubular base section;
wherein the first female/male component of the tubular base section is positioned on the outer wall of the tubular base section, and wherein the first male/female component of the tubular body section is positioned on the inner wall of the tubular body section;
or
wherein the tubular base section comprises:
a2) a first part of a snap lock mechanism configured as a supporting flange for a locking lip of the tubular body section to engage with;
b2) a first female/male component, the first female component configured to removably receive a first male component of the body section;
wherein the tubular body section comprises:
a2) a second part of a snap lock mechanism configured as a locking lip for engaging with the supporting flange of the tubular base section;
b2) a first male/female component, the first female component configured to removably receive a first male component of the tubular base section;
wherein the first female/male component of the tubular base section is positioned on the inner wall of the tubular base section, and wherein the first male/female component of the tubular body section is positioned on the outer wall of the tubular body section.

The mounting link comprises a tubular base section, and a tubular body section.

The tubular base section comprises either:
a1) a first part of a snap lock mechanism configured as a locking lip; and
b1) a first female/male component, the first female component configured to removably receive a first male component of the body section; or
a2) a first part of a snap lock mechanism configured as a supporting flange for a locking lip of the tubular body section to engage with;
b2) a first female/male component, the first female component configured to removably receive a first male component of the body section.

The tubular body section comprises either:
a1) a second part of a snap lock mechanism configured as a supporting flange for the locking lip of the tubular base section to engage with; and
b1) a first male/female component, the first female component configured to removably receive a first male component of the tubular base section; or
a2) a second part of a snap lock mechanism configured as a locking lip for engaging with the supporting flange of the tubular base section;
b2) a first male/female component, the first female component configured to removably receive a first male component of the tubular base section.

In one or more embodiments, the first female/male component of the tubular base section is positioned on the outer wall of the tubular base section, and wherein the first male/female component of the tubular body section is positioned on the inner wall of the tubular body section.

In one or more embodiments, the first female/male component of the tubular base section is positioned on the inner wall of the tubular base section, and wherein the first male/female component of the tubular body section is positioned on the outer wall of the tubular body section.

The mounting link is tubular, i.e. with a lumen, such that cables provided for the hardware will not be pinched or kinked during the rotation or tilting of the link.

In one or more embodiments, the snap lock mechanism configured as a supporting flange in the tubular body section is part of a cable channel opening positioned in the wall of the tubular body section. This configuration allows for a very compact mounting link.

In one or more embodiments, the tubular base section further comprises a rotation limiting channel configured for rotatably engaging with a stop pin. Thereby, a hardware attached to the mounting link may be rotated around a vertical axis of the mounting link to increase the amount of operating positions of the hardware. When the stop pin reaches an end of the rotation limiting channel, the hardware will not be able to rotate further in that direction.

In one or more embodiments, the tubular base section comprises a first base unit and a second base unit; wherein the first base unit comprises a rotation limiting channel configured for rotatably engaging with a stop pin of the second base unit; wherein the second base unit comprises:

a1) a first part of a snap lock mechanism configured as a locking lip for engaging with the supporting flange of the tubular body section; and b1) a first female/male component, the first female component configured to removably receive a first male component of the body section; or a2) a first part of a snap lock mechanism configured as a supporting flange for engaging with the locking lip of the tubular body section;

b2) a first male/female component, the first female component configured to removably receive a first male component of the tubular base section. This configuration allows for a modular system, where the height of the mounting link may be varied by using different lengths/heights of the second base unit. The height/length of the first base unit should be kept as short as possible to avoid slack.

In one or more embodiments, the first male component is configured as a plurality of ribs, and wherein the first female component is configured as a plurality of slits. This configuration allows for a very compact mounting link with minimal slack.

In one or more embodiments, the tubular base section comprises a first part of a snap lock mechanism configured as a locking lip for engaging with the supporting flange of the tubular body section from luminal side of the tubular body section. This configuration allows for a very compact mounting link with minimal slack.

In one or more embodiments, the tubular body section comprises a first part of a snap lock mechanism configured as a locking lip for engaging with the supporting flange of the tubular base section from luminal side of the tubular base section.

In one or more embodiments, the mounting link comprises a plurality of pairs of locking lips and supporting flanges.

In one or more embodiments, the tubular body section comprises a collar part, two opposing neck parts, and two opposing head parts; wherein a neck part connects a head part to the collar part; wherein two opposing cable channel openings are formed by the collar part, the two opposing neck parts, and the two opposing head parts, and wherein a snap lock mechanism configured as a supporting flange in the tubular body section is part of each cable channel opening. The neck part provides a flexible configuration, where the head parts may be moved towards each other when a mounting head is attached thereto by fastening means. The two head parts allow for the attached mounting head to be tilted into different operating positions.

In one or more embodiments, the head parts together form a channel configured for receiving an elongate fastening means; and wherein a well is formed between the two opposing head parts, said well being configured for receiving a link part of a mounting head.

As used in the specification and the appended claims, the singular forms "a", "an", and "the" include plural referents unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

It should be noted that embodiments and features described in the context of one of the aspects of the present invention also apply to the other aspects of the invention.

DETAILED DESCRIPTION OF THE INVENTION

Figure 1:
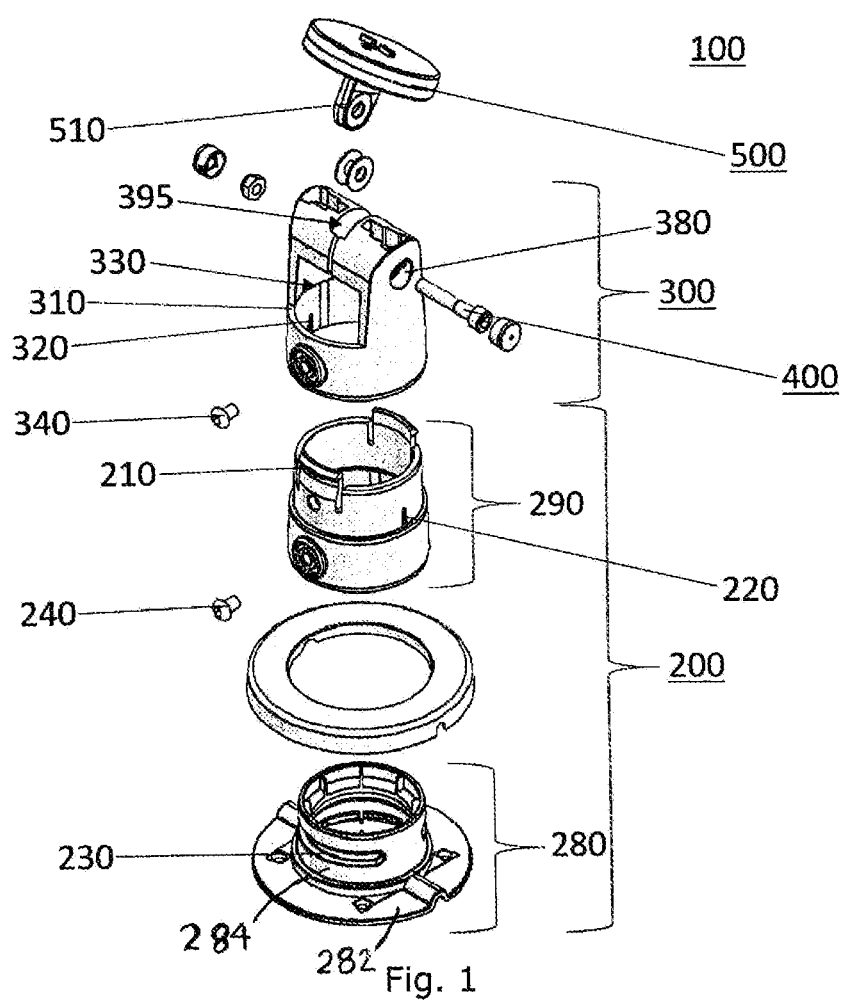
FIG. 1 shows the mounting link in exploded view in accordance with various embodiments of the invention.

Referring to FIG. 1, the general scheme of the invention is shown in exploded view. FIG. 1 shows a mounting link 100 comprising a tubular base section 200, and a tubular body section 300.

The tubular base section 200 comprises a first base unit 280 and a second base unit 290. The first base unit 280 comprises a rotation limiting channel 230 configured for rotatably engaging with a stop pin 240 of the second base unit 290. The second base unit 290 comprises a first part of a snap lock mechanism configured as a locking lip 210 for engaging with the supporting flange of the tubular body section 300. The second base unit 290 also comprises a first male component 220 in the form of a plurality of ribs (only one is shown). The first male component 220 of the tubular base section 200 is positioned on the outer wall of the tubular base section 200. The tubular base unit 280 has a supporting flange 282 and a first male component tubular body 284. The second base unit 290 has a female component 294.

The tubular body section 300 comprises a second part of a snap lock mechanism configured as a supporting flange 310 for the locking lip 210 of the tubular base section 200 to engage with. The snap lock mechanism configured as a supporting flange 310 in the tubular body section 300 is part of a cable channel opening 330 positioned in the wall of the tubular body section 300.

The tubular body section 300 also comprises a first female component 320 in the form of a plurality of slits (only one is shown), and configured to removably receive the first male component 220 of the tubular base section 200. The first female component 320 of the tubular body section 300 is positioned on the inner wall of the tubular body section 300. A part of the tubular base section 200 may be inserted into the tubular body section 300, where the two sections are locked from rotational movement in relation to one another due to the female-male component interaction.

The tubular base section 200 comprises a first part of a snap lock mechanism configured as a locking lip 210 for engaging with the supporting flange 310 of the tubular body section 300 from luminal side of the tubular body section 300. The two sections are thereby locked from vertical movement in relation to one another. The combination of locking the sections from rotational and vertical movement, severely reduces the slack of the mounting link.

Figure 2:
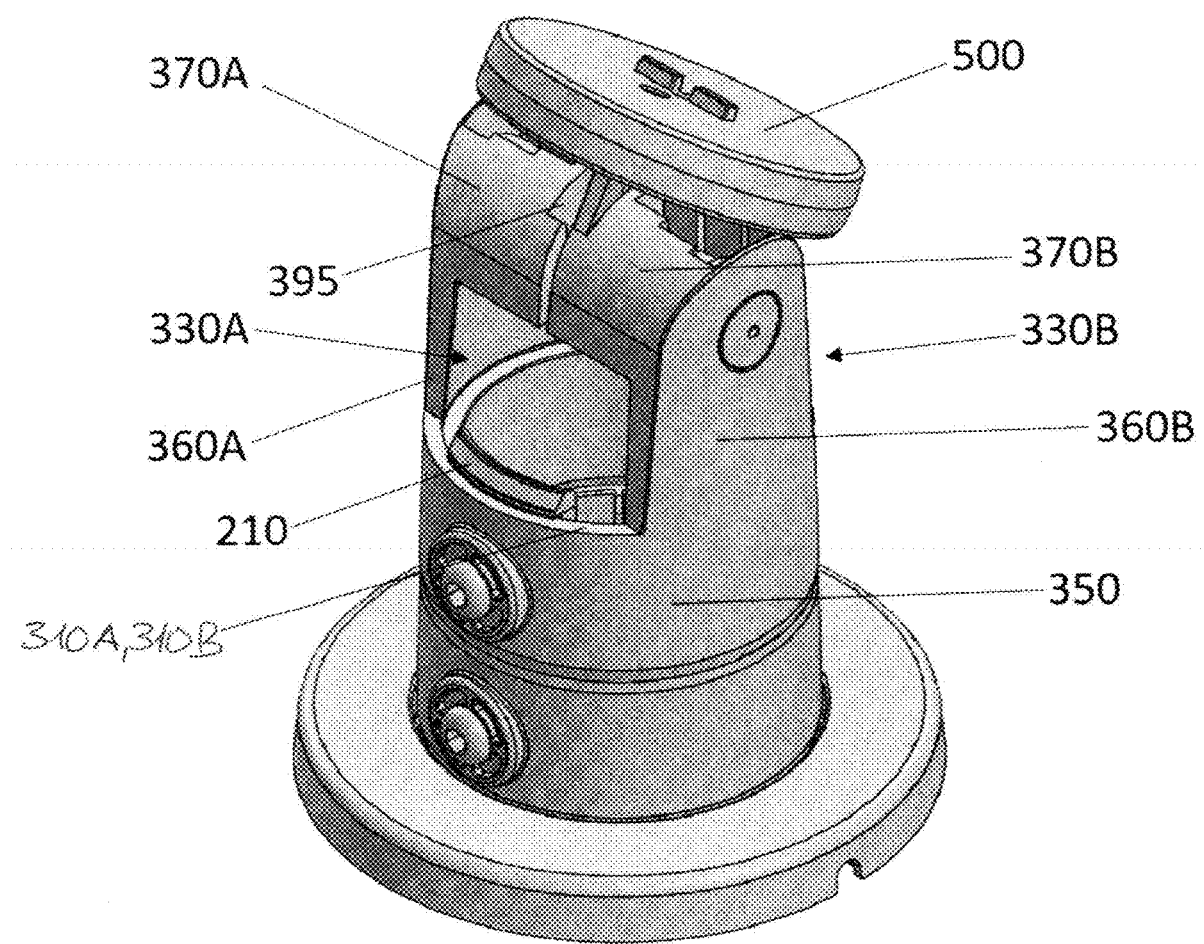
FIG. 2 shows a perspective view of the assembled mounting link of FIG. 1.

FIG. 2 shows a perspective view of the assembled mounting link of FIG. 1. The tubular body section comprises a collar part 350, two opposing neck parts 360A, 360B, and two opposing head parts 370A, 370B. A neck part 360A/360B connects a head part 370A/370B to the collar part 350. Two opposing cable channel openings 330A, 330B are formed by the collar part 350, the two opposing neck parts 360A, 360B, and the two opposing head parts 370A, 370B. A snap lock mechanism configured as a supporting flange 310 in the tubular body section 300 is part of each cable channel opening 330A, 330B.

The head parts 370A, 370B together form a channel 380 (FIG. 1) configured for receiving an elongate fastening means 400. A well 395 is formed between the two opposing head parts 370A, 370B, said well 395 being configured for receiving a link part 510 of a mounting head 500.

Figure 3:
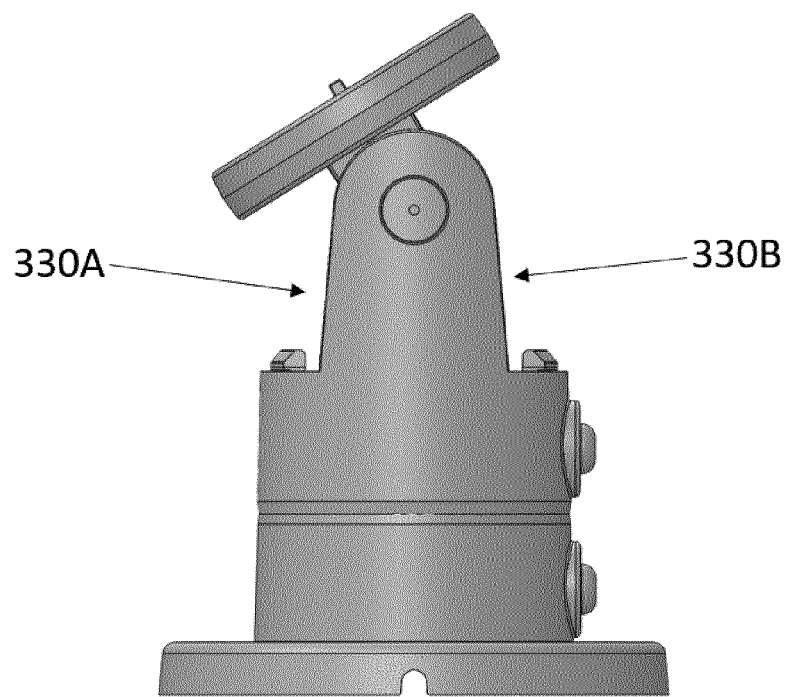
FIG. 3 shows a side view of the assembled mounting link of FIG. 1.

FIG. 3 shows a side view of the assembled mounting link of FIG. 1.

REFERENCES

100 Mounting link
200 Base section
210 Locking lip
220 First male component; rib
230 Rotation limiting channel
240 Stop pin
280 First base unit
290 Second base unit
300 Body section
310 Supporting flange
320 First female component; slit
330 Cable channel opening
340 Stop pin
350 Collar part
360 Neck part
370 Head part
380 Channel
395 Well
400 Elongate fastening means
500 Mounting head
510 Link part

The invention claimed is:

1. A mounting link (100) comprising a tubular base section (200), and a tubular body section (300);
wherein the tubular base section (200) comprises a first base unit (280) and a second base unit (290), the second base unit (290) having:
a1) a first part of a snap lock mechanism configured as a locking lip (210); and
b1) a first male component (220) configured to be received by a first female component (320) of the body section (300) such that the first female component may be removed again from the first male component;
wherein the tubular body section (300) comprises:
a1) a second part of said snap lock mechanism configured as a supporting flange (310) for the locking lip (210) of the tubular base section (200) to engage with; and
b1) said first female component (320) configured to removably receive the first male component (220) of the tubular base section (200);
wherein the first male component (220) of the tubular base section (200) is positioned on the outer wall of the tubular base section (200), and wherein the first female component (320) of the tubular body section (300) is positioned on the inner wall of the tubular body section (300).

2. A mounting link (100) according to claim 1, wherein the second part of said snap lock mechanism configured as a supporting flange in the tubular body section (300) is part of a cable channel opening (330) positioned in the wall of the tubular body section (300).

3. A mounting link (100) according to claim 1, wherein the first male component (220/320) is configured as a plurality of ribs, and wherein the first female component (320) is configured as a plurality of slits.

4. A mounting link (100) according to claim 1, wherein the tubular base section (200) comprises the first part of the snap lock mechanism configured as the locking lip (210) for engaging with the supporting flange (310) of the tubular body section (300) for an inner luminal side of the tubular body section (300).

5. A mounting link (100) according to claim 1, comprising a plurality of pairs of locking lips and supporting flanges.

6. A mounting link (100) according to claim 1, wherein the tubular body section (300) comprises a collar part (350), two opposing neck parts (360A, 360B), and two opposing head parts (370A, 370B); wherein said neck parts (360A/360B) connect said head parts (370A/370B) to the collar part (350); wherein two opposing cable channel openings (330A, 330B) are formed by the collar part (350), the two opposing neck parts (360A, 360B), and the two opposing head parts (370A, 370B), and wherein the second part of the snap lock mechanism configured as a supporting flange (310A, 310B) in the tubular body section (300) is part of each cable channel opening (330A, 330B).

7. A mounting link (100) according to claim 6, wherein the head parts (370A, 370B) together form a channel (380) configured for receiving an elongate fastening means (400); and wherein a well (395) is formed between the two opposing head parts (370A, 370B), said well (395) being configured for receiving a link part (510) of a mounting head (500).

8. A mounting link (100) comprising a tubular base section (200), and a tubular body section (300) wherein the tubular base section (200) comprises: a2) a first part of a snap lock mechanism configured as a locking lip for the tubular body section (300) to engage with; b2) a first male component (220) configured to removably be received by a first female component (320) of the body section (300); wherein the tubular body section (300) comprises: a2) a second part of a snap lock mechanism configured as a supporting flange for engaging with the locking lip of the tubular base section (200); b2) said first female component (320) configured to removably receive said first male component (220) of the tubular base section (200); wherein the first male component (220) of the tubular base section (200) is positioned on the outer wall of the tubular base section (200), and wherein the first female component (320) of the tubular body section (300) is positioned on the inner wall of the tubular body section (300); wherein the tubular base section (200) comprises a first base unit (280) and a second base unit (290); wherein the first base unit (280) comprises a rotation limiting channel (230) configured for rotatably engaging with a stop pin (240) of the second base unit (290); wherein the second base unit (290) comprises: a1) the first part of a snap lock mechanism configured as the locking lip (210) for engaging with the supporting flange of the tubular body section (300); and b1) said first male component (220) configured to removably be received by said first female component (320) of the body section (300).

9. A mounting link (100) according to claim 8, wherein the second part of said snap lock mechanism configured as a supporting flange in the tubular body section (300) is part of a cable channel opening (330) positioned in the wall of the tubular body section (300).

10. A mounting link (100) according to claim 8, wherein the first male component (220/320) is configured as a plurality of ribs, and wherein the first female component (220/320) is configured as a plurality of slits.

11. A mounting link (100) according to claim 8, wherein the tubular base section (200) comprises the first part of a snap lock mechanism configured as the locking lip (210) for engaging with the supporting flange (310) of the tubular body section (300) from an inner (luminal) side of the tubular body section (300).

12. A mounting link (100) according to claim 8, comprising a plurality of pairs of locking lips and supporting flanges.

13. A mounting link (100) according to claim 8, wherein the tubular body section (300) comprises a collar part (350), two opposing neck parts (360A, 360B), and two opposing head parts (370A, 370B); wherein said neck parts (360A/360B) connects said head parts (370A/370B) to the collar part (350); wherein two opposing cable channel openings (330A, 330B) are formed by the collar part (350), the two opposing neck parts (360A, 360B), and the two opposing head parts (370A, 370B), and wherein the second part of the snap lock mechanism configured as the supporting flange (310A, 310B) in the tubular body section (300) is part of each cable channel opening (330A, 330B).

14. A mounting link (100) according to claim 13, wherein the head parts (370A, 370B) together form a channel (380) configured for receiving an elongate fastening means (400); and wherein a well (395) is formed between the two opposing head parts (370A, 370B), said well (395) being configured for receiving a link part (510) of a mounting head (500).

* * * * *